(12) United States Patent
Nishiki et al.

(10) Patent No.: US 7,424,226 B2
(45) Date of Patent: Sep. 9, 2008

(54) OPTICAL CODE DIVISION MULTIPLEXING COMMUNICATION METHOD AND SYSTEM

(75) Inventors: Akihiko Nishiki, Tokyo (JP); Kensuke Sasaki, Kanagawa (JP); Shuko Kobayashi, Tokyo (JP); Satoko Kutsuzawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 468 days.

(21) Appl. No.: 11/185,935

(22) Filed: Jul. 21, 2005

(65) Prior Publication Data
US 2006/0039701 A1  Feb. 23, 2006

(30) Foreign Application Priority Data
Aug. 23, 2004  (JP) ............................. 2004-242051

(51) Int. Cl.
*H04J 14/02* (2006.01)
*H04B 10/12* (2006.01)
*H04B 10/00* (2006.01)

(52) U.S. Cl. .................. 398/149; 398/87; 398/147; 398/161; 398/84

(58) Field of Classification Search ............ 398/74–78, 398/84, 87, 98, 99, 102, 147, 149, 158, 159, 398/161
See application file for complete search history.

(56) References Cited

U.S. PATENT DOCUMENTS

| | | | | |
|---|---|---|---|---|
| 6,381,053 | B1 * | 4/2002 | Fathallah et al. | 398/99 |
| 7,050,676 | B2 * | 5/2006 | Adachi et al. | 385/37 |
| 2002/0163696 | A1 * | 11/2002 | Huang et al. | 359/154 |
| 2004/0175188 | A1 * | 9/2004 | Bellemare et al. | 398/186 |
| 2004/0208564 | A1 * | 10/2004 | Helbing et al. | 398/77 |
| 2004/0208624 | A1 * | 10/2004 | Fathallah et al. | 398/161 |
| 2005/0084266 | A1 * | 4/2005 | Pohjola et al. | 398/77 |
| 2006/0120434 | A1 * | 6/2006 | Fathallah et al. | 375/132 |
| 2006/0147219 | A1 * | 7/2006 | Yoshino et al. | 398/183 |

FOREIGN PATENT DOCUMENTS

JP    2003-244101    8/2003

OTHER PUBLICATIONS

Wei et al., "BER Performance of an Optical Fast-Frequency-Hopping CDMA System with Multiple Simultaneous Users", OFC 2003, Technical Digest, vol. 2,ThQ1, pp. 544-546, Mar. 27, 2003.

(Continued)

*Primary Examiner*—Dalzid Singh
(74) *Attorney, Agent, or Firm*—Venable LLP; Michael A. Sartori; Catherine M. Voorhees (57) ABSTRACT

An optical code division multiplexing communication method includes the steps of: producing a multi-wavelength optical pulse train from wavelength multiplexing pulse; transmitting the multi-wavelength optical pulse train through a transmission line using a time-spreading/wavelength-hopping method; decoding wavelength multiplexing pulse from the multi-wavelength optical pulse train transmitted through the transmission line; compensating delay time differences between individual optical pulses of the multi-wavelength optical pulse train, the delay time differences occurring in the step of transmitting the multi-wavelength optical pulse train through the transmission line; and compensating optical pulse spread in a time direction, which occurs in each of the optical pulses of the multi-wavelength optical pulse train in the step of transmitting the multi-wavelength optical pulse train through the transmission line.

20 Claims, 8 Drawing Sheets

OTHER PUBLICATIONS

Iwamura et al., "FBG based Optical Code En/Decoder for long distance transmission without dispersion compensating devices", OFC2004, Technical Digest, WK6, 2004.

Buryak et al., "Optimization of Refractive Index Sampling for Multichannel Fiber Bragg Gratings", IEEE Journal of Quantum Electronics, vol. 39, No. 1, pp. 91-98, Jan. 2003.

* cited by examiner

OPTICAL CODE DIVISION MULTIPLEXING COMMUNICATION METHOD AND SYSTEM

BACKGROUND OF THE INVENTION

1. Field of the Invention

The present invention relates to an optical code division multiplexing communication method using a time-spreading/wavelength-hopping code, an optical code division multiplexing communication system capable of implementing the optical code division multiplexing communication method, an encoding device constructing the optical code division multiplexing communication system, and a decoding device constructing the optical code division multiplexing communication system, and in particular, to chromatic dispersion compensation in optical code division multiplexing communication.

2. Description of the Related Art

Figure 1:
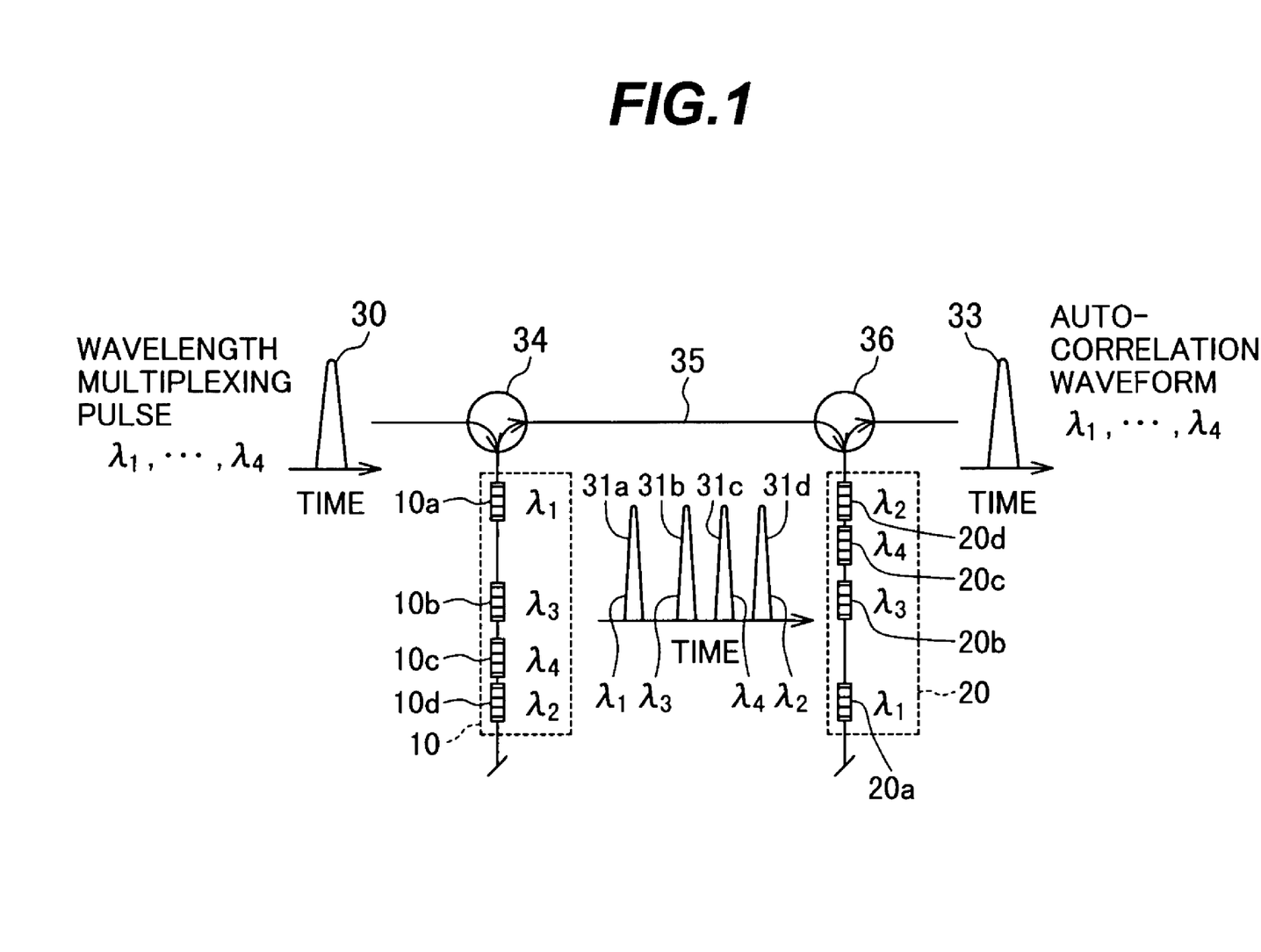
FIG. 1 is a diagram for describing a principle of encoding and decoding in an optical code division multiplexing communication using a time-spreading/wavelength-hopping method.

FIG. 1 is a diagram for describing a principle of encoding and decoding in an optical code division multiplexing communication using a time-spreading/wavelength-hopping method. As shown in FIG. 1, an encoder 10 has a structure in which FBGs (Fiber Bragg Gratings) 10a, ..., 10d of multiple wavelengths (for example, reflecting wavelengths are $\lambda_1$, $\lambda_3$, $\lambda_4$, and $\lambda_2$) are connected in series. When wavelength multiplexing pulse 30 corresponding to the reflecting wavelengths of the FBGs 10a, ..., 10d is inputted to the encoder 10 via an optical circulator 34, a multi-wavelength optical pulse train including four optical pulses 31a, ..., 31d of different wavelengths is produced in a spreading time determined by a code set in the encoder 10 (that is, structure of the encoder 10) from one wavelength multiplexing pulse 30 and is outputted to a transmission line 35 via an optical circulator 34. This multi-wavelength optical pulse train is an encoded optical signal. A decoder 20 of the same codes as the encoder 10 (that is, having a structure of handling the same codes as the encoder 10) has a series structure of FBGs 20d, ..., 20a which is opposite to the series structure of the encoder 10 in which the FBGs 10a, ..., 10d are connected in series. Hence, the decoder 20 has a group delay time characteristic which is opposite to the group delay time characteristic of the encoder 10. Therefore, when the encoded signal (optical pulses 31a, ..., 31d) is inputted to the decoder 20 via an optical circulator 36, time-spread optical pulses of four wavelengths are aligned at the same timing, whereby wavelength multiplexing pulse 33 of auto-correlation waveform is produced and outputted via the optical circulator 36.

When the encoded signal is inputted to the decoder 20, if the codes agree with each other (the series structures of the multi-wavelength FBGs of the encoder 10 and the decoder 20 are related as object and mirror image), the relative time arrangement of the time-spread multi-wavelength optical pulses 31a, ..., 31d is corrected to produce a wavelength multiplexing pulse 33 having an auto-correlation waveform. If the codes do not agree with each other (the series structures of the multi-wavelength FBGs of the encoder 10 and the decoder 20 are not related as object and mirror image), the relative time arrangement of the time-spread multi-wavelength optical pulses 31a, ..., 31d is further spread to produce an cross-correlation waveform (not shown).

In general, the optical code division multiplexing communication using a time-spreading/wavelength-hopping code, as disclosed in the non-patent document 1 (Wei et al., "BER Performance of an Optical Fast Frequency-Hopping CDMA System with Multiple Simultaneous Users", OFC2003, Technical Digest, Vol. 2, ThQ1, pp. 544-546), is characterized in that because an optical signal of a plurality of wavelengths spread in a time range (having a wide frequency band) is used as an encoded signal, as a transmission distance is longer and a transmission signal rate is faster, the optical signal is more susceptible to the chromatic dispersion of the transmission line. Because a transmission line formed of a standard SMF has a chromatic dispersion characteristic of approximately 17 ps/(nm·km), when an encoded optical signal is transmitted through the transmission line, the relative time arrangement between the multi-wavelength optical pulses constructing the encoded optical signal varies according to the transmission distance. Hence, even if a decoder of the same codes as an encoder is used, the auto-correlation waveform as shown in FIG. 1 cannot be produced (that is, the encoded optical signal cannot be excellently decoded). Therefore, when optical code division multiplexing communication using a time-spreading/wavelength-hopping code is applied to a transmission line having chromatic dispersion, if the chromatic dispersion is not compensated to a sufficiently smaller level with respect to the width of an optical signal pulse inputted to the encoder, an excellent auto-correlation waveform cannot be produced. However, when the chromatic dispersion of an individual transmission line is compensated by known means such as a chromatic dispersion compensating fiber, the communication system needs to be increased in size, which results in increasing transmission loss and costs.

Figure 2:
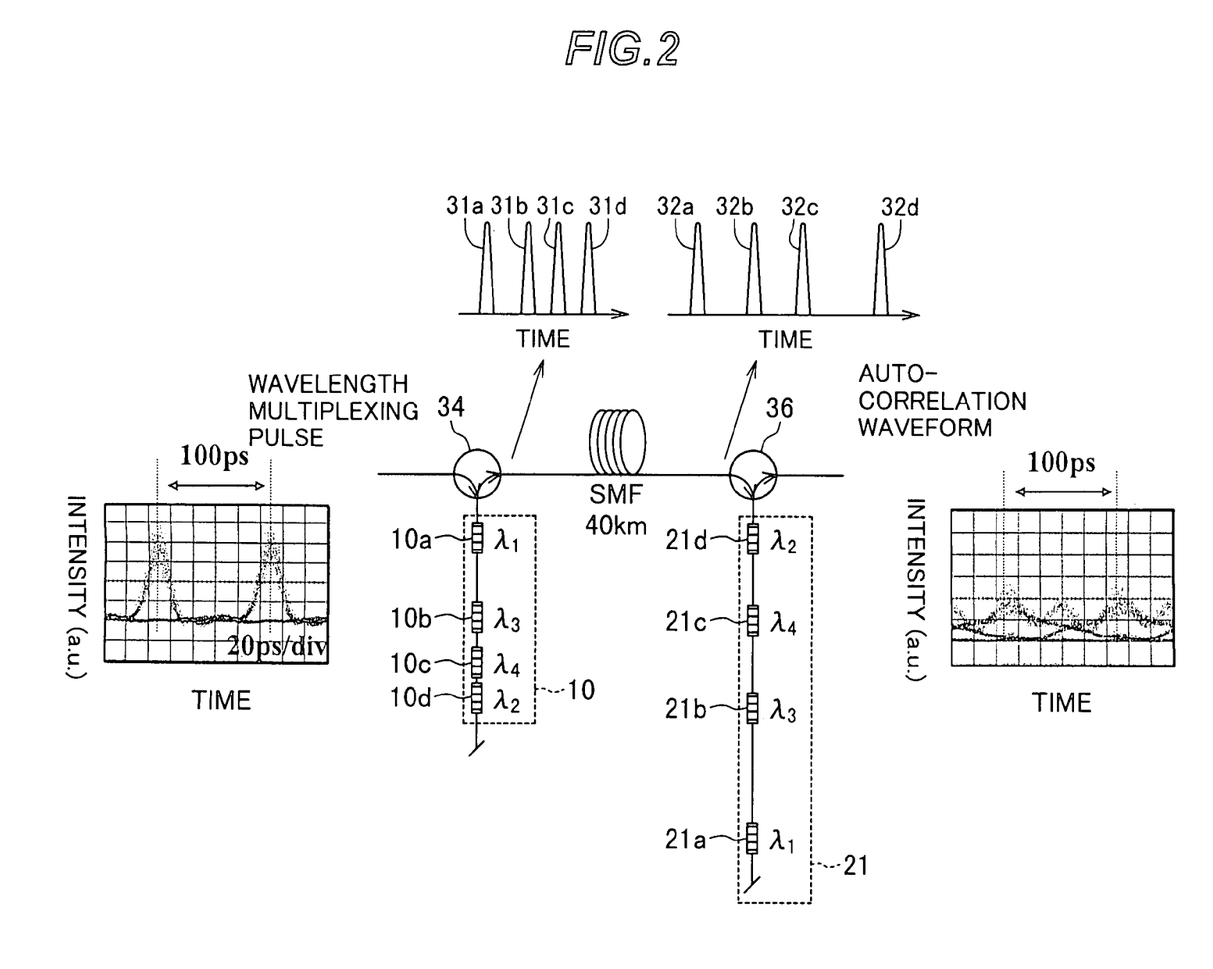
FIG. 2 is a diagram for describing an encoder and a decoder with a delay time compensating function using a time-spreading/wavelength-hopping method.

As to the problem like this, to reduce the effect of the chromatic dispersion with ease, a non-patent document 2 (Iwamura et al., "FBG based Optical Code En/Decoder for long distance transmission without dispersion compensating devices", OFC2004, Technical Digest, WK6) discloses a technology of compensating a delay time difference in a wavelength band (frequency band) in an optical encoded signal, of the effects caused by the chromatic dispersion of an FBG type decoder, by the construction of the FBG type encoder. According to this technology, it is achieved to transmit an encoded optical signal through the SMF of 40 km at a transmission rate of 10 Gbps. FIG. 2 is a diagram for describing an encoder and a decoder having a delay time compensating function in an optical code division multiplexing communication using a time-spreading/wavelength-hopping method. As shown in FIG. 2, when the encoded optical signal is transmitted through the SMF of 40 km, an optical pulse train (optical pulses 31a, ..., 31d) immediately after produced by the encoder 10 is turned to an optical pulse train (optical pulses 32a, ..., 32d) having the delay time difference between wavelengths increased by the transmission through the SMF. Therefore, a decoder 21 has a delay time characteristic in which a delay time characteristic of compensating delay time differences between wavelengths caused by the chromatic dispersion of the SMF transmission line is added to a delay time characteristic opposite to that of the encoder 10.

However, even if the decoder 21 shown in FIG. 2 is used, it is only a wavelength difference and a delay time difference caused by a transmission distance that are compensated, and the optical pulse spread in a time direction of individual optical pulse, which is caused by the chromatic dispersion of the fiber, cannot be compensated. Hence, as the transmission distance is longer, the widths of auto-correlation waveforms are more expanded and the optical pulses finally overlap neighboring optical pulses, thereby making it impossible to receive the optical signal. In this manner, even if the decoder 21 shown in FIG. 2 is used, it is only delay time differences between optical signal wavelengths that are compensated and the expansion of width of the individual optical signal pulse, which is caused by the dispersion slope of the transmission line, is not compensated. Therefore, the transmission distance cannot be more extended.

Further, a non-patent document 3 (Buryak et al., "Optimization of Refractive Index Sampling for Multichannel Fiber Bragg Gratings", IEEE Journal of Quantum Electronics, Vol. 39, No. 1, pp. 91-98, January 2003) discloses a technology related to dispersion slope compensation but does not disclose a technology applied to the compensation of encoded waveforms degraded by the transmission line of the optical code division multiplexing communication of a time-spreading/wavelength-hopping method using an optical signal of a plurality of wavelengths for one communication channel.

SUMMARY OF THE INVENTION

The object of the present invention is to provide an optical code division multiplexing communication method capable of accomplishing the long-distance transmission of an optical signal using a time-spreading/wavelength-hopping method, an optical code division multiplexing communication system capable of implementing this method, and an encoding device and a decoding device that construct this system.

An optical code division multiplexing communication method of the present invention includes the steps of: producing a multi-wavelength optical pulse train from wavelength multiplexing pulse; transmitting the multi-wavelength optical pulse train through a transmission line using a time-spreading/wavelength-hopping method; decoding wavelength multiplexing pulse from the multi-wavelength optical pulse train transmitted through the transmission line; compensating delay time differences between individual optical pulses of the multi-wavelength optical pulse train, the delay time differences occurring in the step of transmitting the multi-wavelength optical pulse train through the transmission line; and compensating optical pulse spread in a time direction, which occurs in each of the optical pulses of the multi-wavelength optical pulse train in the step of transmitting the multi-wavelength optical pulse train through the transmission line.

Further, an optical code division multiplexing communication system of the present invention includes: an encoder for producing a multi-wavelength optical pulse train from wavelength multiplexing pulse; a decoder for decoding the wavelength multiplexing pulse from the multi-wavelength optical pulse train after the multi-wavelength optical pulse train is transmitted through a transmission line using a time-spreading/wavelength-hopping method; a delay time difference compensator for compensating delay time differences between individual optical pulses of the multi-wavelength optical pulse train, the delay time differences occurring when the multi-wavelength optical pulse train is transmitted through the transmission line; and a chromatic dispersion compensator for compensating optical pulse spread in a time direction, which occurs in each of optical pulses of the multi-wavelength optical pulse train when the multi-wavelength optical pulse train is transmitted through the transmission line.

Furthermore, an encoding device includes: an encoder for producing a multi-wavelength optical pulse train to be transmitted through a transmission line in an optical code division multiplexing communication, in which the multi-wavelength optical pulse train produced from wavelength multiplexing pulse is transmitted through the transmission line using a time-spreading/wavelength-hopping method and the wavelength multiplexing pulse is decoded from the multi-wavelength optical pulse train transmitted through the transmission line; and a chromatic dispersion compensator for compensating optical pulse spread in a time direction, which occurs in each of the optical pulses of the multi-wavelength optical pulse train when the multi-wavelength optical pulse train is transmitted through the transmission line.

Moreover, a decoding device includes: a decoder for decoding wavelength multiplexing pulse from a multi-wavelength pulse train transmitted through a transmission line in an optical code division multiplexing communication, in which the multi-wavelength optical pulse train produced from wavelength multiplexing pulse is transmitted through the transmission line using a time-spreading/wavelength-hopping method and the wavelength multiplexing pulse is decoded from the multi-wavelength optical pulse train transmitted through the transmission line; a delay time difference compensator for compensating delay time differences between individual optical pulses of the multi-wavelength optical pulse train, the delay time differences occurring when the multi-wavelength pulse train is transmitted through the transmission line; and a chromatic dispersion compensator for compensating optical pulse spread in a time direction of individual optical pulse of the multi-wavelength optical pulse train, the optical pulse spread occurring when the multi-wavelength optical pulse train is transmitted through the transmission line.

According to the present invention, delay time differences between individual optical pulses of a multi-wavelength optical pulse train and the optical pulse spread in a time direction of the individual optical pulse, which are caused when the multi-wavelength optical pulse train is transmitted through a transmission line using a time-spreading/wavelength-hopping method, are compensated and hence the wavelength multiplexing pulse can be excellently decoded. Therefore, the present invention can produce an effect of further elongating a transmission distance.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 3:
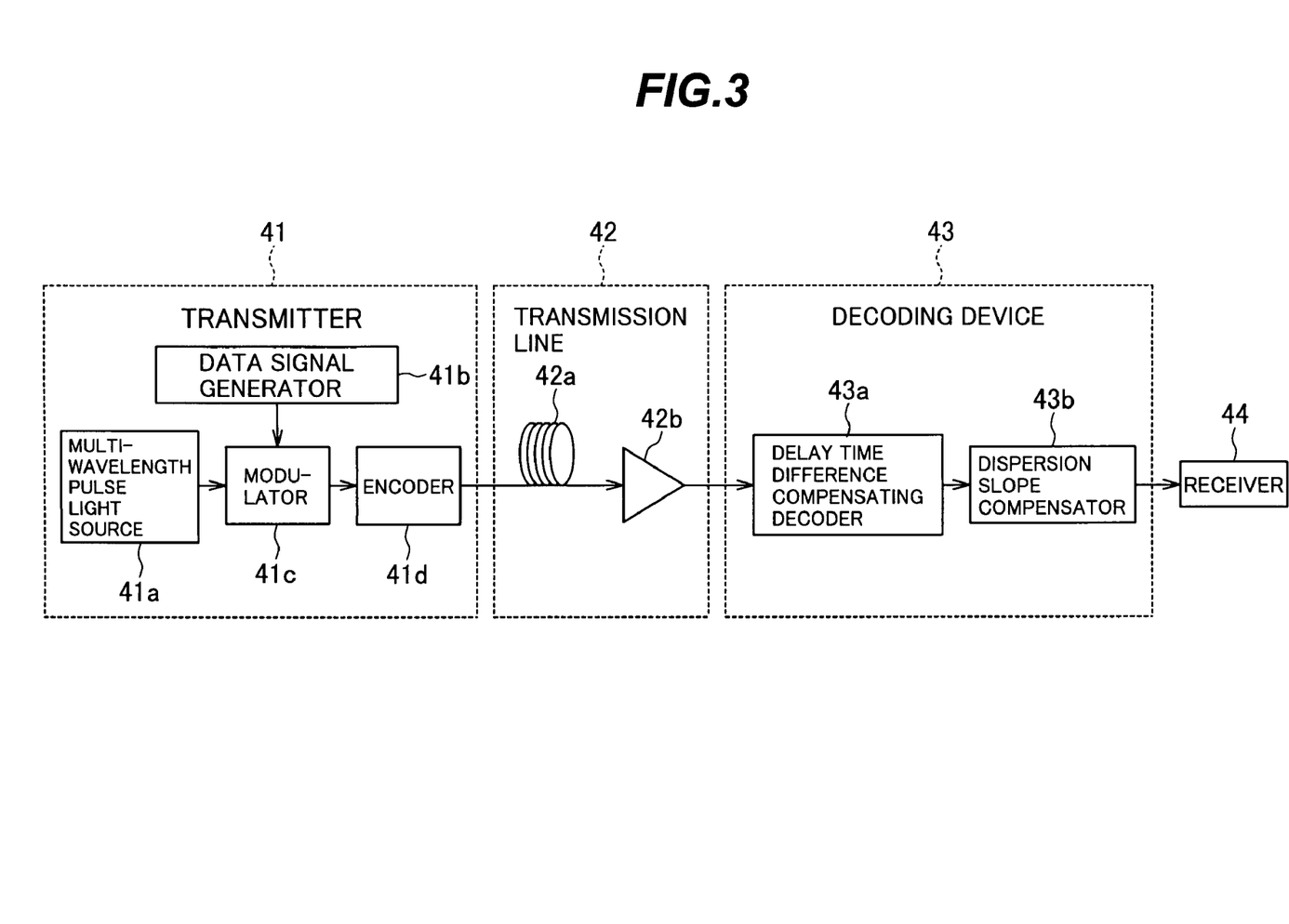
FIG. 3 is a block diagram showing the construction of an optical code division multiplexing communication system of the first embodiment (that is, a system capable of implementing an optical code division multiplexing communication method of the first embodiment) of the present invention.

FIG. 3 is a block diagram showing the construction of an optical code division multiplexing communication system of the first embodiment (that is, a system capable of implementing an optical code division multiplexing communication method of the first embodiment) of the present invention. As shown in FIG. 3, the optical code division multiplexing communication system of the first embodiment includes a transmitter 41, a decoding device 43 connected to the transmitter 41 by a transmission line 42, and a receiver 44.

As shown in FIG. 3, the transmitter 41 includes a multi-wavelength optical pulse light source 41a for producing a wavelength multiplexing pulse, a data signal generator 41b, a wavelength multiplexing pulse modulator 41c which modulates a wavelength multiplexing pulse on the basis of a control signal from the data signal generator 41b, and an encoder which produces a multi-wavelength optical pulse train (for example, corresponding to optical pulses 31a, . . . , 31d in FIG. 1 and FIG. 2) from the modulated wavelength multiplexing pulse (for example, corresponding to wavelength multiplexing pulse 30 in FIG. 1).

Figure 4:
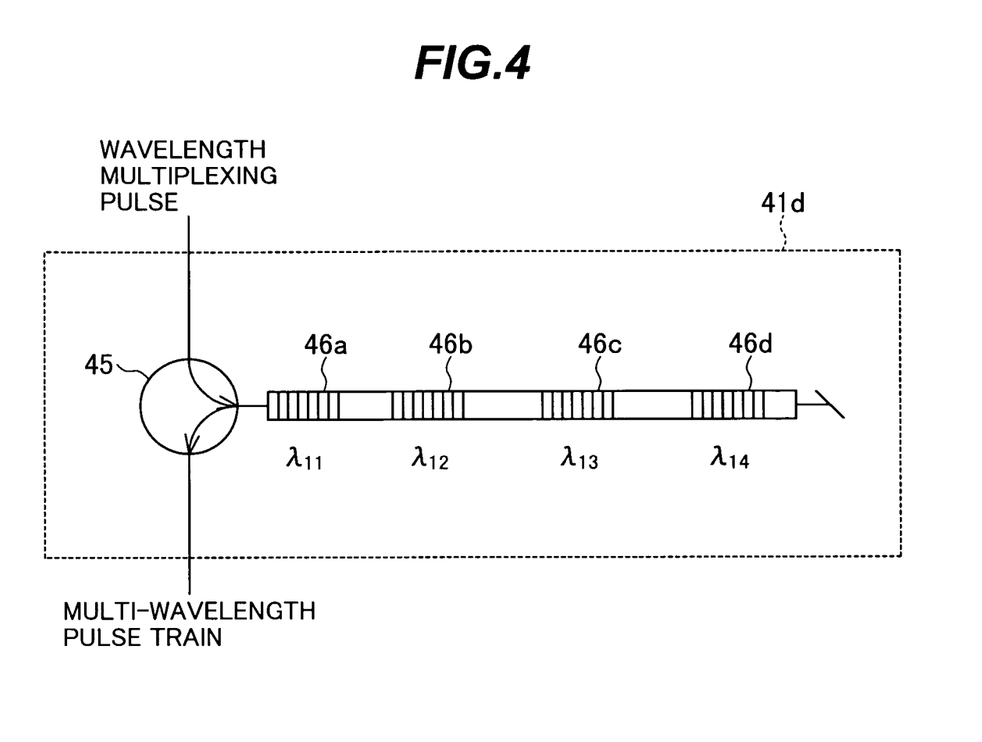
FIG. 4 is a diagram schematically showing the structure of an encoder.

FIG. 4 is a diagram schematically showing an example of a structure of the encoder 41d. As shown in FIG. 4, the encoder 41d has a structure in which an optical circulator 45 and FBGs 46a, . . . , 46d, which have reflecting wavelengths $\lambda_{11}$, $\lambda_{12}$, $\lambda_{13}$, and $\lambda_{14}$, respectively, are connected in series. This structure is similar to the structure shown in FIG. 5(b) of JAPANESE PATENT KOKAI (LAID-OPEN) PUBLICATION NO. 2003-244101. Further, the number of FBGs connected in series may be more than or less than four.

As shown in FIG. 3, the transmission line 42 includes a single-mode fiber (SMF) 42a and an optical amplifier 42b which compensates the loss of the SMF 42a.

Moreover, as shown in FIG. 3, the decoding device 43 includes a delay time difference compensating decoder 43a and a dispersion slope compensator 43b.

Figure 5:
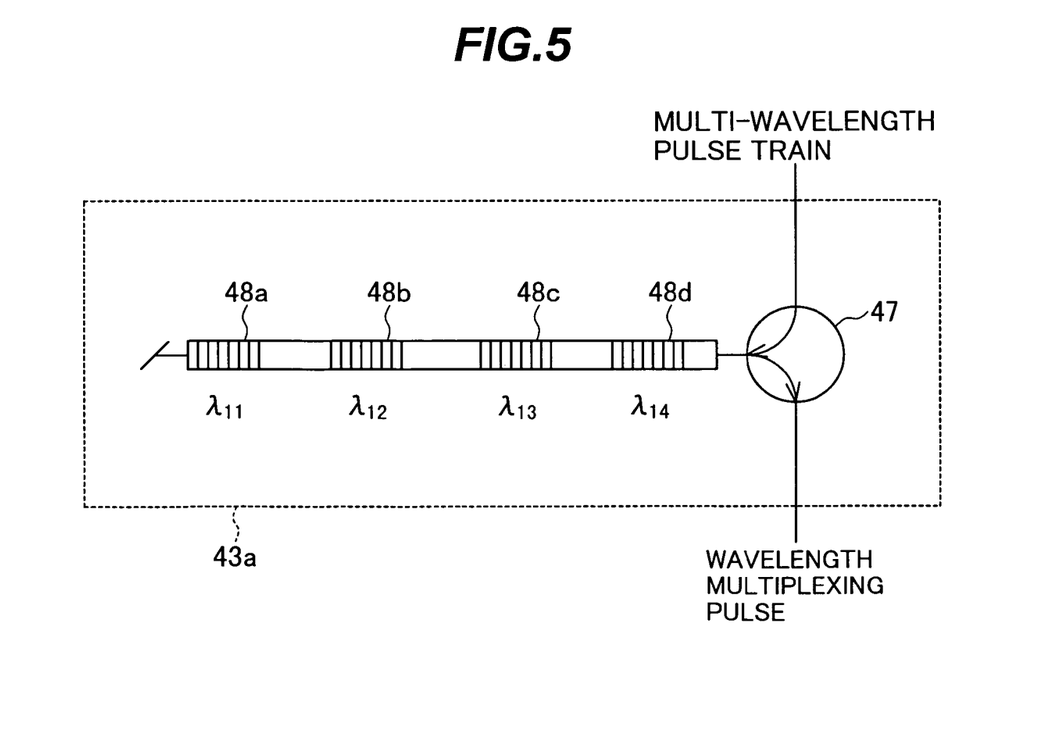
FIG. 5 is a diagram schematically showing the structure of a delay time compensating decoder.

FIG. 5 is a diagram schematically showing an example of the structure of the delay time difference compensating decoder 43a. As shown in FIG. 5, the delay time difference compensating decoder 43a has a structure in which an optical circulator 47 and FBGs 48d, . . . , 48a that have reflecting wavelengths $\lambda_{14}$, $\lambda_{13}$, $\lambda_{12}$, and $\lambda_{11}$, respectively, are connected in series. The FBGs 48d, . . . , 48a are arranged at intervals determined on the basis of delay time differences between individual optical pulses of an inputted multi-wavelength optical pulse train. The delay time difference compensating decoder 43a has a function of decoding wavelength multiplexing pulse from the multi-wavelength optical pulse train (corresponding to encoded signals 32a, . . . , 32d in FIG. 2) after the multi-wavelength optical pulse train is transmitted through the transmission line 42 and a delay time difference compensating function of compensating delay time differences between the individual optical pulses of the multi-wavelength optical pulse train produced when the multi-wavelength optical pulse train is transmitted through the transmission line 42. The structure of the delay time difference compensating decoder 43a is similar to the structure shown in FIG. 6 of JAPANESE PATENT KOKAI (LAID-OPEN) PUBLICATION NO. 2003-244101.

Figure 6A:
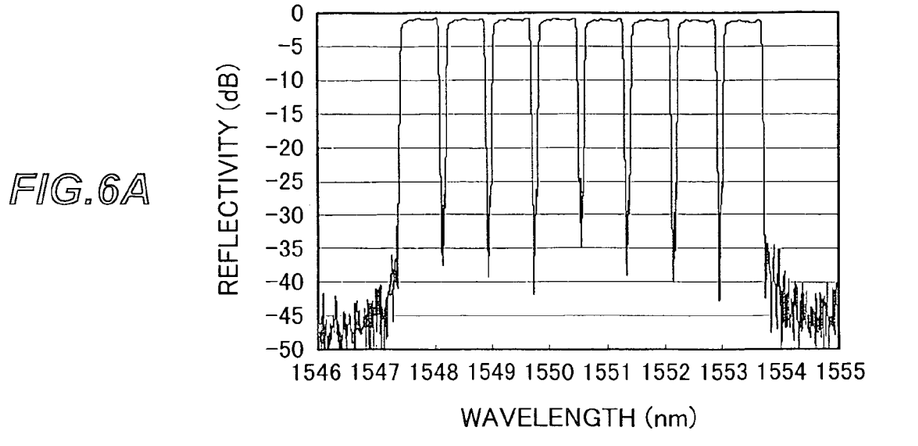
FIGS. 6A to 6C are diagrams showing a reflectivity characteristic, a group delay time characteristic, and the structure of a dispersion slope compensator.
Figure 6B:
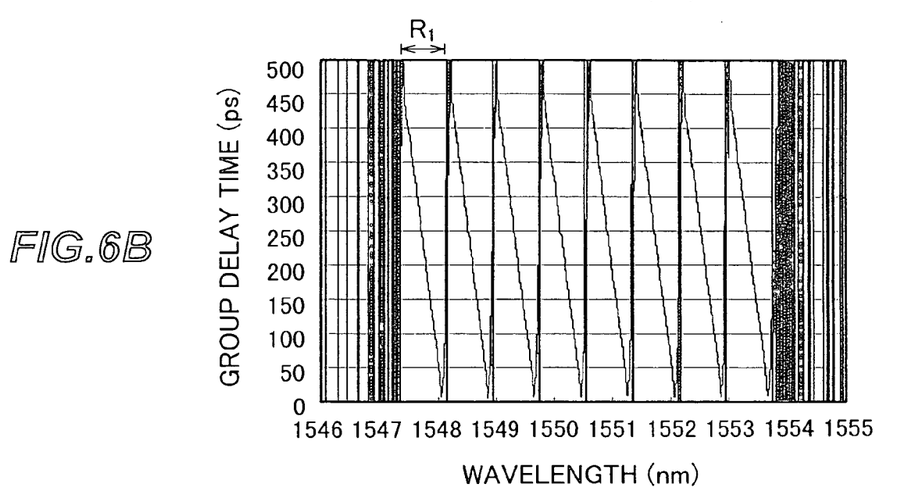
Figure 6C:
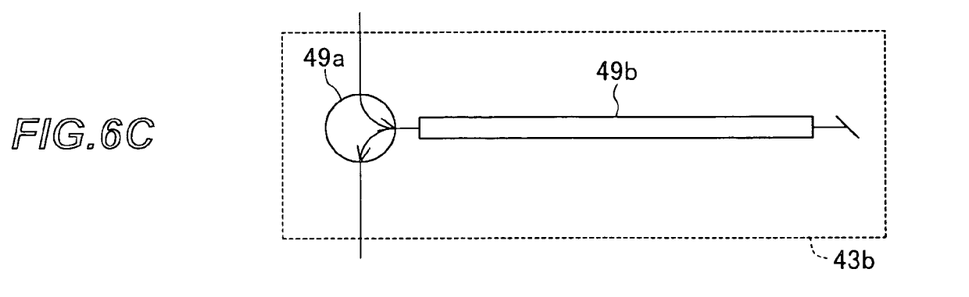

FIGS. 6A to 6C are diagrams schematically showing the reflectivity characteristic, the group delay time characteristic, and a structure of the dispersion slope compensator 43b. As shown in FIG. 6C, the dispersion slope compensator 43b includes, for example, an optical circulator 49a and a sampled FBG 49b. The dispersion slope compensator 43b compensates such an optical pulse spread in a time direction of individual optical pulse of the multi-wavelength pulse train that is caused by the chromatic dispersion when the multi-wavelength pulse train is transmitted through the transmission line 42. The sampled FBG 49b has a plurality of refractive index modulating structures formed in an optical waveguide (for example, the core of an optical fiber) so as to have a chirp structure and phase shift structures formed between the plurality of refractive index modulating structures, and is also referred to as an SS (Super Structure) FBG. The sampled FBG 49b has a characteristic of hardly producing delay time differences between the wavelengths. The reflectivity characteristic of the dispersion slope compensator 43b used for a multi-wavelength optical pulse train of 8 wavelengths at intervals of 100 GHz is shown in FIG. 6A. As shown in a wavelength range $R_1$ in FIG. 6B, the dispersion slope compensator 43b has a chromatic dispersion slope (approximately −680 ps/nm) opposite to the chromatic dispersion slope of an SMF transmission line of 40 km within a wavelength band corresponding to an optical signal of one wavelength. It is also recommended to employ such a compensator of other principle and structure that has the characteristics shown in FIGS. 6A and 6B as the dispersion slope compensator 43b.

In this regard, in FIG. 3 is shown an example in which the dispersion slope compensator 43b is provided in the latter stage of the delay time difference compensating decoder 43a. However, the dispersion slope compensator 43b may be provided in the former stage of the delay time difference compensating decoder 43a.

Figure 7A:
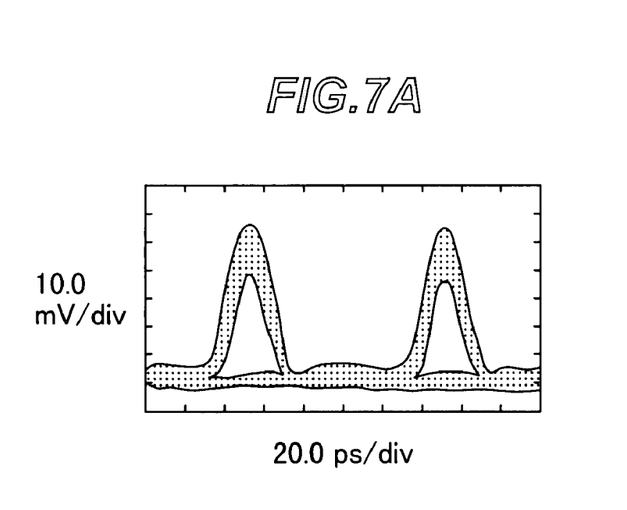
FIGS. 7A to 7D are diagrams showing the waveform of pulses inputted to an encoder, the waveform of pulses outputted from the encoder, the waveform of pulses decoded by a decoder, and the waveform of pulses compensated by a dispersion slope compensator.
Figure 7B:
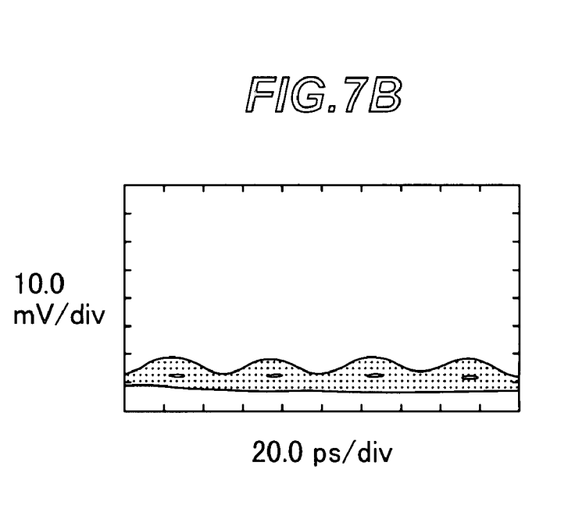
Figure 7C:
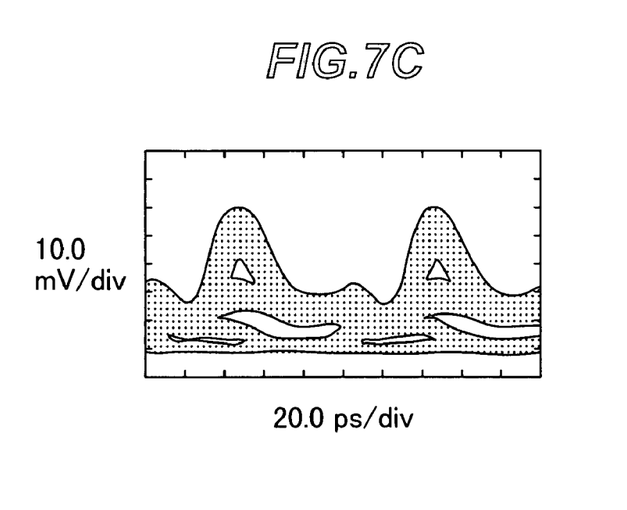
Figure 7D:
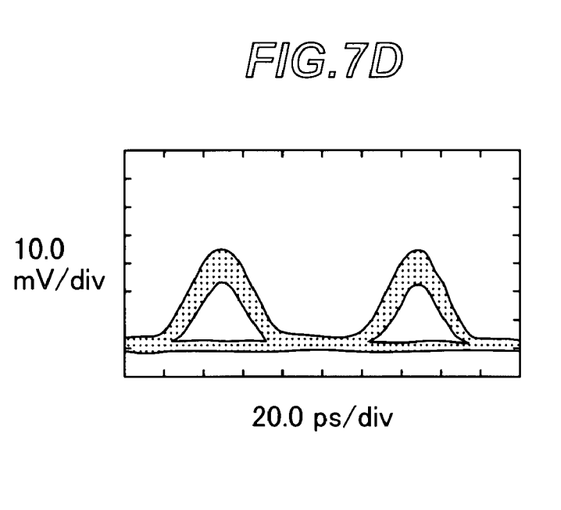

The operation of the optical multiplexing encoding system of the first embodiment (that is, optical multiplexing encoding method of the first embodiment) will be described below. FIGS. 7A to 7D are diagrams based on actual data, wherein FIG. 7A shows a waveform of pulses inputted to the encoder 41d, FIG. 7B shows a waveform of pulses outputted from the encoder 41d, FIG. 7C shows a waveform of pulses decoded by the decoder 43a, and FIG. 7D shows a waveform of pulses compensated by the dispersion slope compensator 43b.

First, an RZ wavelength division multiplexing optical pulse train of four wavelengths ($\lambda_{11}$, $\lambda_{12}$, $\lambda_{13}$, and $\lambda_{14}$) at intervals of 100 GHz from the multi-wavelength optical pulse light source 41a is modulated by the modulator 41c to, for example, an RZ wavelength multiplexing pulse train of a period of 10 Gbps according to desired data from the data signal generator 41b. At this time, it is assumed that RZ optical pulses constructing the RZ wavelength multiplexing pulse train have a width of, for example, 18 ps. When the RZ wavelength multiplexing pulse is inputted to the encoder 41*d*, the RZ wavelength multiplexing pulse is reflected by the FBGs corresponding to the individual wavelengths, whereby an optical pulse train, in which optical pulses have arbitrary delay time differences between the wavelengths, respectively, is produced. Here, the order of FBGs of the respective wavelengths, which are connected in series, and the intervals between the respective FBGs are determined by a desired code. This optical pulse train is an encoded signal and is transmitted through the transmission line 42 in this state.

A standard SMF has a dispersion characteristic of approximately 17 ps/(nm·km). Hence, when optical wavelength multiplexing pulses at intervals of 0.8 nm are transmitted through the 40 km SMF, a transmission time difference of approximately 544 ps (=0.8×17×40) is produced between the optical pulses by the chromatic dispersion of the SMF. Further, the widths of individual optical pulses are also expanded. As a result, when the encoded signal is transmitted through the SMF, the delay time difference between the wavelengths and such an optical pulse spread in a time direction of the optical pulse that is caused by the chromatic dispersion are superimposed to the delay time difference between the optical pulses caused by the encoding.

The encoded signal affected by this chromatic dispersion is inputted to the decoding device (decoder module) 43. In the decoding device 43, the encoded signal affected by this chromatic dispersion is inputted to the delay time difference compensating decoder 43*a*. When the codes match each other, the delay time differences between the wavelengths, provided at the time of encoding, and the delay time differences between the wavelengths, produced by the chromatic dispersion of the transmission line 42, are compensated, whereby the optical pulses of individual wavelengths are aligned at the same timing. However, such an optical pulse spread in a time direction of the individual optical pulse that is caused by the chromatic dispersion of the transmission line 42 is not compensated by the delay time difference compensating decoder 43*a*. Moreover, when the codes do not match each other, the optical pulses are further spread in a time direction.

Next, when the optical pulses from the delay time difference compensating decoder 43*a* are inputted to the sampled FBG type dispersion slope compensator 43*b*, the widths of the individual optical pulses are compressed to a state close to a state before transmission through the transmission line 42 by the negative dispersion slope of this dispersion slope compensator 43*b* (see FIGS. 7A and 7D). In this manner, such an optical pulse spread in a time direction of the individual optical signal pulse that is caused by the chromatic dispersion of the transmission line 42 is compensated by the sampled FBG type dispersion slope compensator 43*b* and hence the wavelength multiplexing pulse is excellently decoded. Therefore, there is an effect that a transmission distance can be elongated.

Further, a system (conventional system) using a dispersion compensating fiber to compensate a dispersion slope is suitable for compensating a wide wavelength range in a collective manner but requires a large-sized and expensive apparatus. For this reason, a method and a system in accordance with the present invention are more advantageous for a node of receiving a specific number of wavelengths from the viewpoint of reducing the size of apparatus and reducing costs.

Second Embodiment

Figure 8:
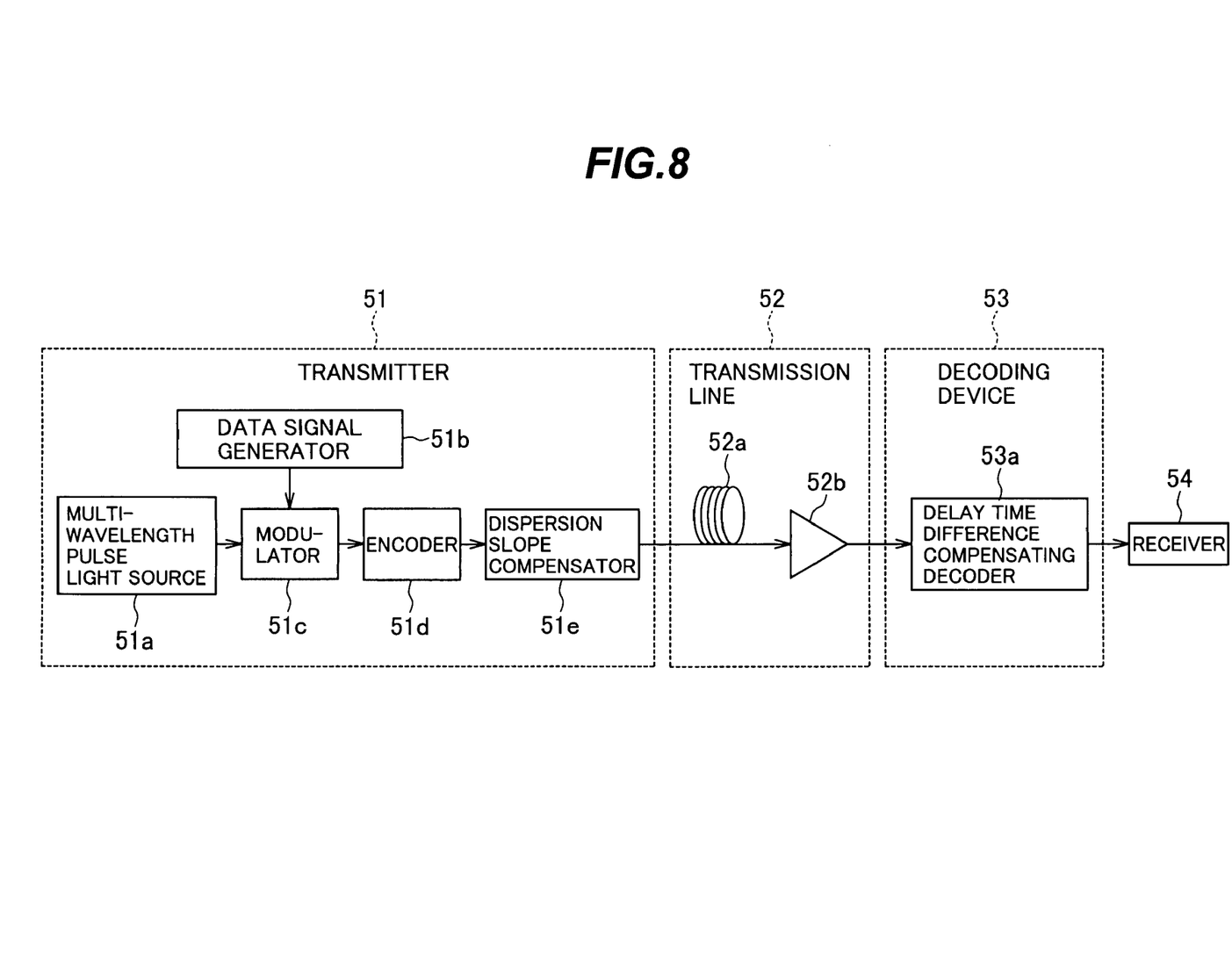
FIG. 8 is a block diagram showing the construction of an optical code division multiplexing communication system of the second embodiment (that is, a system capable of implementing an optical code division multiplexing communication method of the second embodiment) of the present invention.

FIG. 8 is a block diagram showing the construction of an optical code division multiplexing communication system of the second embodiment (that is, a system capable of implementing an optical code division multiplexing communication method of the second embodiment) of the present invention. As shown in FIG. 8, the optical code division multiplexing communication system of the second embodiment is different, in that a dispersion slope compensator 51*e* is provided in the former stage of a transmission line 52, from the optical code division multiplexing communication system of the first embodiment in which the dispersion slope compensator (43*b* in FIG. 3) is provided in the latter stage of the transmission line (42 in FIG. 3).

A multi-wavelength pulse light source 51*a*, a data signal generator 51*b*, a modulator 51*c*, and an encoder 51*d* in FIG. 8 correspond to the multi-wavelength pulse light source 41*a*, the data signal generator 41*b*, the modulator 41*c*, and the encoder 41*d* in FIG. 3 (the first embodiment), respectively. Further, a transmission line 52 in FIG. 8 corresponds to the transmission line 42 in FIG. 3. Furthermore, a delay time difference compensating decoder 53*a* in FIG. 8 corresponds to the delay time difference compensating decoder 43*a* in FIG. 3. Moreover, a receiver 54 in FIG. 8 corresponds to the receiver 44 in FIG. 3. Still further, in FIG. 8, a dispersion slope compensator 51*e* is provided in place of the dispersion slope compensator 43*b* in FIG. 3. Here, the dispersion slope compensator 51*e* may be provided in the former stage of the encoder 51*d*.

Because the dispersion slope compensator 51*e* is provided in a transmitter 51 in the optical code division multiplexing communication system of the second embodiment, all optical pulses are transmitted in a state where the optical pulses are pre-chirped in response to the chromatic dispersion of the transmission line 52. When the pre-chirped optical encoded signal is transmitted through the transmission line 52, the chirp of the optical pulses is returned to the original state by the chromatic dispersion of the transmission line 52 but the delay time differences between the wavelengths occur as is the case with the first embodiment. Hence, by compensating the delay time differences by the delay time difference compensating decoder 53*b*, an excellent decoded waveform (auto-correlation waveform) can be obtained.

As described above, according to the second embodiment, the similar effect to the first embodiment can be produced. Moreover, according to the second embodiment, the transmitter 51 compensates the dispersion slope and the decoding device 53 on the receiver side compensates the delay time difference (that is, the transmitting side and the receiving side share the compensation of the chromatic dispersion), and hence a dispersion characteristic in which the transmitted optical pulses are pre-chirped can be obtained. Therefore, this makes it difficult for the third party trying an unauthorized access to make a corresponding decoder and hence can improve the concealment of information in an encoding communication system.

Except for the above-described respects, the second embodiment is the same as the first embodiment.

Third Embodiment

Figure 9:
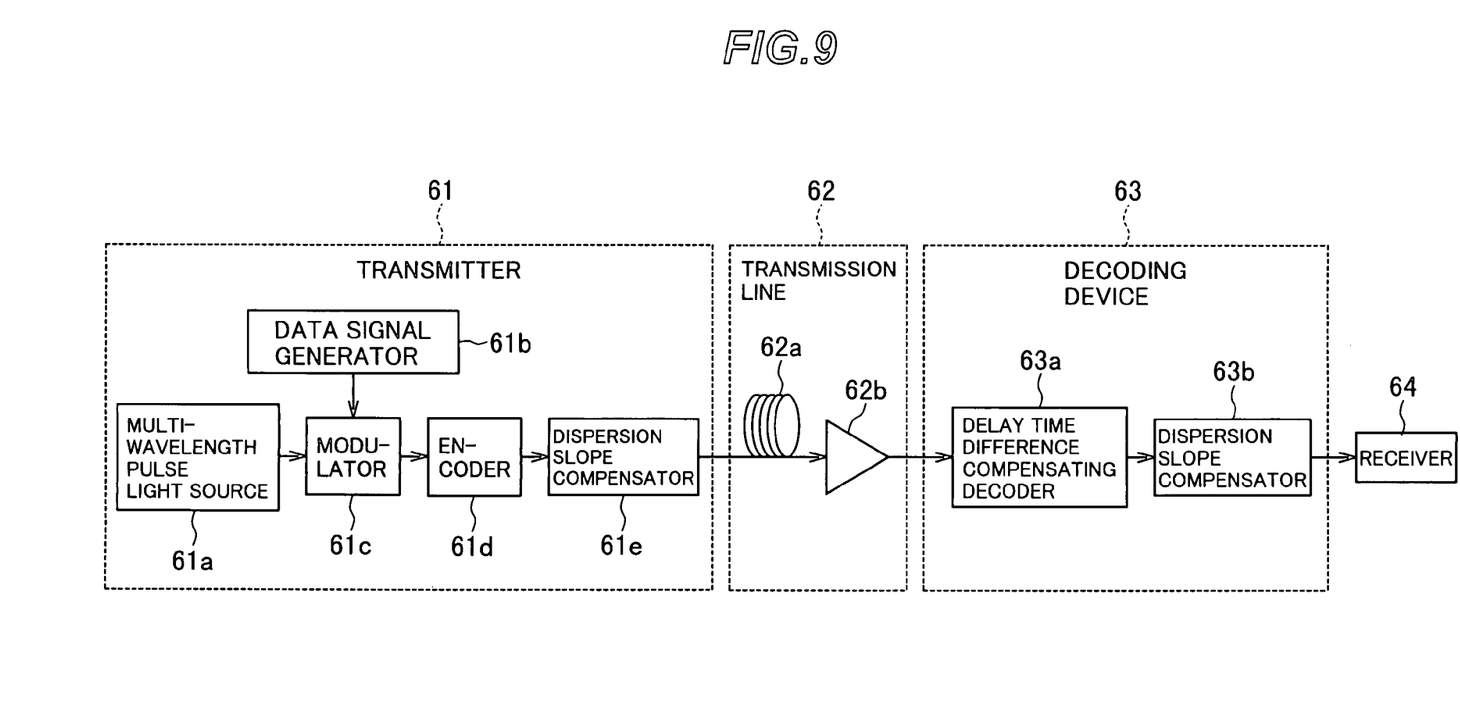
FIG. 9 is a block diagram showing the construction of an optical code division multiplexing communication system of the third embodiment (that is, a system capable of implementing an optical code division multiplexing communication method of the third embodiment) of the present invention.

FIG. 9 is a block diagram showing the construction of an optical code division multiplexing communication system of the third embodiment (that is, a system capable of implementing an optical code division multiplexing communication method of the third embodiment) of the present invention. As shown in FIG. 9, the optical code division multiplexing communication system of the third embodiment is different, in that a dispersion slope compensator 61*e* is provided in the former stage of a transmission line 62 and in that a dispersion slope compensator 63*b* is provided in the latter stage of the transmission line 62, from the optical code division multiplexing communication system of the first embodiment in which the dispersion slope compensator (43b in FIG. 3) is provided only in the latter stage of the transmission line (42 in FIG. 3).

A multi-wavelength pulse light source 61a, a data signal generator 61b, a modulator 61c, and an encoder 61d in FIG. 9 correspond to the multi-wavelength pulse light source 41a, the data signal generator 41b, the modulator 41c, and the encoder 41d in FIG. 3 (the first embodiment), respectively. Further, the transmission line 62 in FIG. 9 corresponds to the transmission line 42 in FIG. 3. Furthermore, a delay time difference compensating decoder 63a in FIG. 9 corresponds to the delay time difference compensating decoder 43a in FIG. 3. Moreover, a receiver 64 in FIG. 9 corresponds to the receiver 44 in FIG. 3. Still further, in FIG. 9, dispersion slope compensators 61e and 63b are provided in place of the dispersion slope compensator 43b in FIG. 3. Here, the dispersion slope compensator 61e may be provided in the former stage of the encoder 61d. Moreover, the dispersion slope compensator 63b may be provided in the former stage of the delay time difference compensating decoder 63b.

The dispersion slope compensator 61e corresponding to an SMF transmission line of 40 km is provided in a transmitter 61 in the optical code division multiplexing communication system of the third embodiment and hence all optical pulses are transmitted in a state where the optical pulses are pre-chirped in response to the half of chromatic dispersion of the transmission line 62 of 80 km. When the pre-chirped optical encoded signal is transmitted through the transmission line 62, the pre-chirp of the optical pulses is returned to the original state by the chromatic dispersion of the transmission line 62 and further is affected by the chromatic dispersion corresponding to the SMF of 40 km. That is, the optical pulse spread in a time direction of individual optical pulse is the same as that in the case of the SMF of 40 km but delay time differences between the wavelengths are caused by the transmission line of the SMF of 80 km. Hence, in accordance with the decoding device 63 including the dispersion slope compensator 63b corresponding to the SMF of 40 km and the delay time difference compensating decoder 63b corresponding to the SMF of 80 km, excellent decoded waveform (auto-correlation waveform) can be obtained.

As described above, according to the third embodiment, the similar effect to the first embodiment can be produced. Moreover, according to the third embodiment, the transmitter 61 compensates the dispersion slope and the decoding device 63 on the receiver side compensates the delay time difference and the dispersion slope (that is, the transmitting side and the receiving side share the compensation of the chromatic dispersion) and hence a dispersion characteristic in which the transmitted optical pulses are pre-chirped can be obtained. Therefore, this makes it difficult for the third party trying an unauthorized access to make a corresponding decoder and hence can improve the concealment of information in an encoding communication system.

Further, to respond to long-distance transmission, the quantity of compensation of the dispersion slope compensator needs to be increased. This results in elongating the total length of FBGs constructing a dispersion slope compensator and hence increasing difficulty in the manufacturing of the FBGs. However, according to the third embodiment, by employing the dispersion slope compensators of length to be easily manufactured in combination at the transmitting side and the receiving side, the still longer distance transmission of the optical signal can be achieved.

Except for the above-described respects, the third embodiment is the same as the first or second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An optical code division multiplexing communication method comprising the steps of:
   producing a multi-wavelength optical pulse train from wavelength multiplexing pulse;
   transmitting the multi-wavelength optical pulse train through a transmission line using a time-spreading/wavelength-hopping method;
   decoding wavelength multiplexing pulse from the multi-wavelength optical pulse train transmitted through the transmission line;
   compensating delay time differences between individual optical pulses of the multi-wavelength optical pulse train, the delay time differences occurring in the step of transmitting the multi-wavelength optical pulse train through the transmission line; and
   compensating optical pulse spread in a time direction, which occurs in each of the optical pulses of the multi-wavelength optical pulse train in the step of transmitting the multi-wavelength optical pulse train through the transmission line;
   wherein the step of producing the multi-wavelength optical pulse train is performed by an encoder including a plurality of Bragg gratings connected in series, the plurality of Bragg gratings of the encoder having specific reflecting wavelengths, respectively;
   wherein the step of decoding wavelength multiplexing pulse is performed by a decoder including a plurality of Bragg gratings connected in series, the plurality of Bragg gratings of the decoder having specific reflecting wavelengths, respectively; and
   wherein the step of compensating delay time differences is performed by a delay time difference compensator having a structure in which the plurality of Bragg gratings of the decoder are arranged at intervals determined on the basis of the delay time differences between individual optical pulses of the multi-wavelength optical pulse train.

2. The optical code division multiplexing communication method according to claim 1, wherein the step of compensating the delay time differences is performed in parallel with the step of decoding the wavelength multiplexing pulse.

3. The optical code division multiplexing communication method according to claim 2, wherein the step of compensating optical pulse spread in a time direction, which occurs in each of the optical pulses of the multi-wavelength optical pulse train, is performed either before or after the step of transmitting the multi-wavelength optical pulse train through the transmission line.

4. The optical code division multiplexing communication method according to claim 2, wherein the step of compensating optical pulse spread in a time direction, which occurs in each of the optical pulses of the multi-wavelength optical pulse train, is performed both before and after the step of transmitting the multi-wavelength optical pulse train through the transmission line.

5. The optical code division multiplexing communication method according to claim 1, wherein the step of compensating optical pulse spread in a time direction, which occurs in each of the optical pulses of the multi-wavelength optical pulse train, is performed either before or after the step of transmitting the multi-wavelength optical pulse train through the transmission line.

6. The optical code division multiplexing communication method according to claim 1, wherein the step of compensating optical pulse spread in a time direction, which occurs in each of the optical pulses of the multi-wavelength optical pulse train, is performed both before and after the step of transmitting the multi-wavelength optical pulse train through the transmission line.

7. An optical code division multiplexing communication system comprising:
   an encoder for producing a multi-wavelength optical pulse train from wavelength multiplexing pulse;
   a decoder for decoding the wavelength multiplexing pulse from the multi-wavelength optical pulse train after the multi-wavelength optical pulse train is transmitted through a transmission line using a time-spreading/wavelength-hopping method;
   a delay time difference compensator for compensating delay time differences between individual optical pulses of the multi-wavelength optical pulse train, the delay time differences occurring when the multi-wavelength optical pulse train is transmitted through the transmission line; and
   a chromatic dispersion compensator for compensating optical pulse spread in a time direction, which occurs in each of optical pulses of the multi-wavelength optical pulse train when the multi-wavelength optical pulse train is transmitted through the transmission line;
   wherein the encoder includes a plurality of Bragg gratings connected in series, the plurality of Bragg gratings of the encoder having specific reflecting wavelengths, respectively;
   wherein the decoder includes a plurality of Bragg gratings connected in series, the plurality of Bragg gratings of the decoder having specific reflecting wavelengths, respectively; and
   wherein the delay time difference compensator has a structure in which the plurality of Bragg gratings of the decoder are arranged at intervals determined on the basis of the delay time differences between individual optical pulses of the multi-wavelength optical pulse train.

8. The optical code division multiplexing communication system according to claim 7, wherein the delay time difference compensator forms a part of the decoder.

9. The optical code division multiplexing communication system according to claim 8, wherein the chromatic dispersion compensator is provided in either a former or latter stage of the transmission line.

10. The optical code division multiplexing communication system according to claim 8, wherein the chromatic dispersion compensator is provided in each of former and latter stages of the transmission line.

11. The optical code division multiplexing communication system according to claim 7, wherein the chromatic dispersion compensator is provided in either a former or latter stage of the transmission line.

12. The optical code division multiplexing communication system according to claim 7, wherein the chromatic dispersion compensator is provided in each of former and latter stages of the transmission line.

13. An optical code division multiplexing communication system comprising:
   an encoder for producing a multi-wavelength optical pulse train from wavelength multiplexing pulse;
   a decoder for decoding the wavelength multiplexing pulse from the multi-wavenlength optical pulse train after the multi-wavelength optical pulse train is transmitted through a transmission line using a time-spreading/wavelength-hopping method;
   a delay time difference compensator for compensating delay time differences between individual optical pulses of the multi-wavelength optical pulse train, the delay time differences occurring when the multi-wavelength optical pulse train is transmitted through the transmission line; and
   a chromatic dispersion compensator for compensating optical pulse spread in a time direction, which occurs in each of optical pulses of the multi-wavelength optical pulse train when the multi-wavelength optical pulse train is transmitted through the transmission line;
   wherein the chromatic dispersion compensator includes a sampled Bragg grating, which has a reflectivity characteristic of reflecting light in a wavelength band corresponding to individual optical pulse of the multi-wavelength optical pulse train and a group delay time characteristic having dispersion slopes, in which delay time of reflecting light decreases as a wavelength increases in respective wavelength bands corresponding to individual optical pulses of the multi-wavelength optical pulse train.

14. The optical code division multiplexing communication system according to claim 13, wherein the chromatic dispersion compensator is provided in each of former and latter stages of the transmission line.

15. The optical code division multiplexing communication system according to claim 13, wherein the chromatic dispersion compensator is provided in either a former or latter stage of the transmission line.

16. An encoding device comprising:
   an encoder for producing a multi-wavelength optical pulse train to be transmitted through a transmission line in an optical code division multiplexing communication, in which the multi-wavelength optical pulse train produced from wavelength multiplexing pulse is transmitted through the transmission line using a time-spreading/wavelength-hopping method and the wavelength multiplexing pulse are decoded from the multi-wavelength optical pulse train transmitted through the transmission line; and
   a chromatic dispersion compensator for compensating optical pulse spread in a time direction, which occurs in each of the optical pulses of the multi-wavelength optical pulse train when the multi-wavelength optical pulse train is transmitted through the transmission line;
   wherein the chromatic dispersion compensator includes a sampled Bragg grating having a reflectivity characteristic of reflecting light in a wavelength band corresponding to individual optical pulse of the multi-wavelength optical pulse train and a group delay time characteristic in which dispersion slopes are opposite to dispersion slopes of the transmission line in respective wavelength bands corresponding to individual optical pulses of the multi-wavelength optical pulse train.

17. The encoding device according to claim 16, wherein the encoder includes a plurality of Bragg gratings connected in series, the plurality of Bragg gratings of the encoder having specific reflecting wavelengths, respectively.

18. A decoding device comprising:
   a decoder for decoding wavelength multiplexing pulse from a multi-wavelength pulse train transmitted through a transmission line in an optical code division multiplexing communication, in which the multi-wavelength optical pulse train produced from wavelength multiplexing pulse is transmitted through the transmission line using a time-spreading/wavelength-hopping method and the wavelength multiplexing pulse is decoded from the multi-wavelength optical pulse train transmitted through the transmission line;

a delay time difference compensator for compensating delay time differences between individual optical pulses of the multi-wavelength optical pulse train, the delay time differences occurring when the multi-wavelength pulse train is transmitted through the transmission line; and a chromatic dispersion compensator for compensating optical pulse spread in a time direction of individual optical pulse of the multi-wavelength optical pulse train, the optical pulse spread occurring when the multi-wavelength optical pulse train is transmitted through the transmission line;

wherein the decoder includes a plurality of Bragg gratings having connected in series, the plurality of Bragg gratings of the decoder having specific reflecting wavelengths, respectively; and wherein the delay time difference compensator has a structure in which the plurality of Bragg gratings of the decoder are arranged at intervals determined on the basis of the delay time differences between individual optical pulses of the multi-wavelength optical pulse train.

19. A decoding device comprising:

a decoder for decoding wavelength multiplexing pulse from a multi-wavelength pulse train transmitted through a transmission line in an optical code division multiplexing communication, in which the multi-wavelength optical pulse train produced from wavelength multiplexing pulse is transmitted through the transmission line using a time-spreading/wavelength-hopping method and the wavelength multiplexing pulse is decoded from the multi-wavelength optical pulse train transmitted through the transmission line;

a delay time difference compensator for compensating delay time differences between individual optical pulses of the multi-wavelength optical pulse train, the delay time differences occurring when the multi-wavelength pulse train is transmitted through the transmission line; and a chromatic dispersion compensator for compensating optical pulse spread in a time direction of individual optical pulse of the multi-wavelength optical pulse train, the optical pulse spread occurring when the multi-wavelength optical pulse train is transmitted through the transmission line;

wherein the chromatic dispersion compensator includes a sampled Bragg grating, which has a reflectivity characteristic of reflecting light in a wavelength band corresponding to individual optical pulse of the multi-wavelength optical pulse train and a group delay time characteristic having dispersion slopes, in which delay time of reflecting light decreases as a wavelength increases in respective wavelength bands corresponding to individual optical pulses of the multi-wavelength optical pulse train.

20. An optical code division multiplexing communication method comprising the steps of:

producing a multi-wavelength optical pulse train from wavelength multiplexing pulse;

transmitting the multi-wavelength optical pulse train through a transmission line using a time-spreading/wavelength-hopping method;

decoding wavelength multiplexing pulse from the multi-wavelength optical pulse train transmitted through the transmission line;

compensating delay time differences between individual optical pulses of the multi-wavelength optical pulse train, the delay time differences occurring in the step of transmitting the multi-wavelength optical pulse train through the transmission line; and compensating optical pulse spread in a time direction, which occurs in each of the optical pulses of the multi-wavelength optical pulse train in the step of transmitting the multi-wavelength optical pulse train through the transmission line;

wherein the step of the compensating optical pulse spread is performed by a chromatic dispersion compensator including a sampled Bragg grating having a reflectivity characteristic of reflecting light in a wavelength band corresponding to individual optical pulse of the multi-wavelength optical pulse train and a group delay time characteristic in which dispersion slopes are opposite to dispersion slopes of the transmission line in respective wavelength bands corresponding to individual optical pulses of the multi-wavelength optical pulse train.

* * * * *